(12) United States Patent
McIntyre

(10) Patent No.: US 8,087,676 B2
(45) Date of Patent: Jan. 3, 2012

(54) SUSPENSION HEIGHT ADJUSTMENT MECHANISM

(76) Inventor: Kevin Joseph McIntyre, Sydney (AU)

( * ) Notice: Subject to any disclaimer, the term of this patent is extended or adjusted under 35 U.S.C. 154(b) by 120 days.

(21) Appl. No.: 12/383,232

(22) Filed: Mar. 19, 2009

(65) Prior Publication Data

US 2009/0261542 A1    Oct. 22, 2009

(51) Int. Cl.
*B60G 17/00* (2006.01)
(52) U.S. Cl. .................................................. 280/6.157
(58) Field of Classification Search .............. 280/5.514, 280/5.157, 6.157; 267/166, 255, 286, 248
See application file for complete search history.

(56) References Cited

U.S. PATENT DOCUMENTS 5,335,695 A * 8/1994 Pierce .......................... 137/627.5

2008/0018065 A1 * 1/2008 Hirao et al. .................. 280/6.157

* cited by examiner

*Primary Examiner* — Paul N Dickson
*Assistant Examiner* — Robert A Coker

(57) ABSTRACT

This disclosure relates to a suspension height adjustment mechanism comprising a main body, a rotatable assembly being rotatably mounted to the main body and having a first threaded portion, a tool engagement portion for rotating the rotatable assembly, a spring support having a second threaded portion engaging the first threaded portion, an anti-rotation means on the spring support adapted to cooperate with a corresponding anti-rotation means on the main body to prevent rotation of the spring support with respect to the main body, such that, in use, rotation of the tool engagement portion causes the spring support to axially translate along the rotatable assembly, thus adjusting the height of the suspension. This disclosure also relates to a vehicle suspension system comprising the suspension height adjustment mechanism and to a vehicle comprising the vehicle suspension system.

29 Claims, 19 Drawing Sheets

SUSPENSION HEIGHT ADJUSTMENT MECHANISM

FIELD OF THE INVENTION

The present invention relates to vehicle suspension systems and in particular to a suspension height adjustment mechanism.

The invention has been developed primarily for use with cars, trucks, SUVs, 4WDs and motorcycles and will be described hereinafter with reference to these applications. However, it will be appreciated that the invention is not limited to these particular fields of use. For example, the suspension height adjustment mechanism could be used on aircraft undercarriage or on armored vehicles.

The invention can be used in conjunction with any suitable suspension systems, including independent arms, struts, semi-trailing arms and trail arm suspension arrangements.

BACKGROUND OF THE INVENTION

Varying the height of a vehicle's suspension is a common aftermarket modification. Height adjustment can be achieved by adjusting the height of the springs by a mechanical arrangement or in the case of pneumatic or hydraulic suspension arrangements by pneumatic or hydraulic means. Some modern SUVs and cars use height adjustability as part of an active suspension system, for example, the Mercedes-Benz Active Body Control system. Some city buses also incorporate height adjustment to allow elderly or handicapped passengers to board and alight more easily.

Lifting a vehicle's suspension increases the height between the axle and the underside of the body providing more ground clearance to the bodywork of the vehicle. This allows larger wheels or tyres to be fitted, which, in turn, increases ground clearance.

For street vehicles, a kit for lifting a vehicle's suspension will typically comprise longer struts, longer springs and remounted shocks. For off-road vehicles having beam axles and transfer cases, the suspension system is typically a leaf-spring system, so the kit will comprise a set of blocks that fit between the beam axles and the bottom of the leaf spring. Alternatively, some kits have blocks which lower the spring mounts themselves so that the spring-to-axle joint is not changed. Lift kits are mainly used on trucks and SUVs.

Lowering a vehicle's suspension is another common modification and generally lowers the centre of gravity and thus improves handling. Lowering kits typically comprise shorter, stiffer springs and gas shocks. In addition to providing height adjustment, these kits typically allow for adjustment of rebound dampening and compression dampening.

The most common form of suspension adjustment mechanism comprises a stationary, externally threaded tube inside the coil spring. The base of the tube is usually attached to a lower suspension control arm. The body of the shock absorber may pass through the tube, in which case, the tube may be attached to the shock absorber or may be integrally formed with part of the shock absorber.

The external thread of the tube normally engages a matching outer threaded collar that supports the base of the coil spring. In other arrangements, the threaded collar mounts on top of the coil spring with the internal tube attached to the above frame of the vehicle.

Such adjustment mechanisms are raised and lowered by use of a C-shaped wrench to engage the outer circumference of the coil seat collar so that it can be rotated. Three or more sets of engaging, rotating then re-engaging of the C-shaped wrench may be required per revolution of the collar. This is a very labor and time intensive process and is made more so by difficulty in rotating the outer threaded collar. This difficulty arises due to the collar's close proximity to other suspension components which means that the wrench may only be able to be used over a short travel and with little leverage.

One specific form of varying suspension height is by preloading the suspension and is commonly carried out on motorcycles. In this context, preload is used to adjust the initial position of the suspension with the weight of the motorcycle and rider acting on it. Both the front forks and rear shock or shocks can be adjusted on most modern motorcycles. Some motorcycles have externally accessible preload adjustments. Typically, this is a screw-type adjustment that moves a backing plate inside the fork against the top of the fork spring. The farther down the adjuster is screwed, the more force is applied to the spring, and the higher the preload.

The present invention seeks to provide a suspension height adjustment mechanism which will overcome or substantially ameliorate at least some of the deficiencies of the prior art, or to at least provide an alternative.

It is to be understood that, if any prior art information is referred to herein, such reference does not constitute an admission that the information forms a part of the common general knowledge in the art, in Australia or any other country.

SUMMARY OF THE INVENTION

According to a first aspect of the invention there is provided a suspension height adjustment mechanism comprising:
  a main body,
  a rotatable assembly being rotatably mounted to the main body and having a first threaded portion,
  a tool engagement portion for rotating the rotatable assembly,
  a spring support having a second threaded portion engaging the first threaded portion, and
  an anti-rotation means on the spring support adapted to cooperate with a corresponding anti-rotation means on the main body to prevent rotation of the spring support with respect to the main body,
  such that, in use, rotation of the tool engagement portion causes the spring support to axially translate along the rotatable assembly, thus adjusting the height of the suspension.

Advantageously, embodiments of the adjustment mechanism provide a simplified adjustment arrangement. The adjustment mechanism can be easily used since adjustment is achieved merely by turning of the tool engagement portion. Advantageously, the tool engagement portion can be easily adjusted by a fast ratchet wrench adjustment, air impact wrench, 24 volt impact wrench, standard or compact ratchet wrench, electric or pneumatic powered nut running tools or by an active suspension system having its own motorized driving unit. This considerably reduces the adjustment time and physical effort involved in adjusting the suspension.

A second advantage of embodiments of the adjustment mechanism is that, in most situations, because of the more direct access, the suspension system does not need to be jacked up and the wheels removed before adjustment can take place.

A third advantage of embodiments of the adjustment mechanism is that use of a special 'C' wrench followed by a lock ring is not required to adjust the suspension height and thus associated labor can be avoided.

A fourth advantage of embodiments of the invention is that the tool engagement portion, being smaller than prior art collars, can be turned by a less bulky tool. The relatively small size of the tool engagement portion also means that it is easier to access.

In one form, an end of the rotatable assembly proximal to the main body comprises a shaft aligned with the axis of the rotatable assembly and adapted to extend through an aperture in the main body to terminate at the tool engagement portion.

Advantageously, this arrangement may be used where there is access below or above the main body (depending on the orientation of the suspension), adjacent to where the rotatable assembly is mounted to it.

In another form the suspension height adjustment mechanism further comprises an auxiliary body comprising an auxiliary assembly rotatably mounted thereto, the auxiliary assembly comprising a first gear portion and the tool engagement portion, wherein an end of the rotatable assembly proximal to the main body comprises a second gear portion meshing with the first gear portion, such that rotation of the tool engagement portion causes the first gear portion to rotate the second gear portion and thus rotate the rotatable assembly.

Advantageously, this arrangement may be used where there is limited or no access below or above the main body (depending on the orientation of the suspension), adjacent to where the rotatable assembly is mounted to it.

Preferably, the axis of rotation of the first gear portion is non-parallel with the axis of rotation of the second gear portion.

Preferably, the axis of rotation of the first gear portion is substantially perpendicular to the axis of rotation of the second gear portion.

Preferably, the axis of rotation of the first gear portion is substantially parallel with the axis of rotation of the second gear portion.

Preferably, the first and second gear portions are peripherally disposed around the auxiliary assembly and rotatable assembly, respectively.

Preferably, the diameter of the second gear portion is larger than the diameter of the first gear portion.

Preferably, the anti-rotation means is one or more tongues, the corresponding anti-rotation means is one or more grooves and the one or more tongues are adapted for sliding engagement in the one or more grooves.

Preferably, the anti-rotation means is one or more grooves and the corresponding anti-rotation means is one or more tongues adapted for sliding engagement in the one or more grooves.

Preferably, the first threaded portion is externally disposed on the rotatable assembly and the spring support comprises a tube and a circumferential flange extending from the outer surface thereof, the second threaded portion being disposed on an inner surface of the tube.

Preferably, the anti-rotation means is integral with the spring support.

Preferably, the corresponding anti-rotation means is provided by the main body.

Preferably, the corresponding anti-rotation means is integral with the main body.

Preferably, the rotatable assembly is in the form of a tube and is adapted to house a damper or portion thereof.

Preferably, the main body and the auxiliary body are integral.

Preferably, the main body forms part of a suspension lower mount.

Preferably, the main body forms part of a suspension upper mount.

Preferably, the tool engagement portion is adapted for rotation by a hand tool, an electric drill tool or a pneumatic drill tool.

According to a second aspect of the invention a vehicle suspension system is provided comprising the suspension height adjustment mechanism of any one of the preceding paragraphs.

Preferably, the vehicle suspension system is of coil spring, hydraulic spring, pneumatic spring or magnetic spring type.

Preferably, the spring support is adapted to support a coil, hydraulic, pneumatic or magnetic spring.

Preferably, the spring is a conventionally wound compression coil spring.

Preferably, the spring is a progressively wound compression coil spring having a region of reduced coil pitch at one end of the spring.

Preferably, the tool engagement portion is located and orientated in such a way that it can be turned by a tool from the side of the vehicle adjacent the suspension system.

Preferably, the tool engagement portion is adapted for rotation by either a power tool or a hand tool.

Preferably, the tool engagement portion is adapted for rotation by a power tool only.

According to a third aspect of the invention there is provided a vehicle comprising the vehicle suspension system of any one of the preceding paragraphs.

BRIEF DESCRIPTION OF THE DRAWINGS

Notwithstanding any other forms which may fall within the scope of the present invention, a preferred embodiment of the invention will now be described, by way of example only, with reference to the accompanying drawings in which.

DETAILED DESCRIPTION OF SPECIFIC EMBODIMENTS

Figure 1:
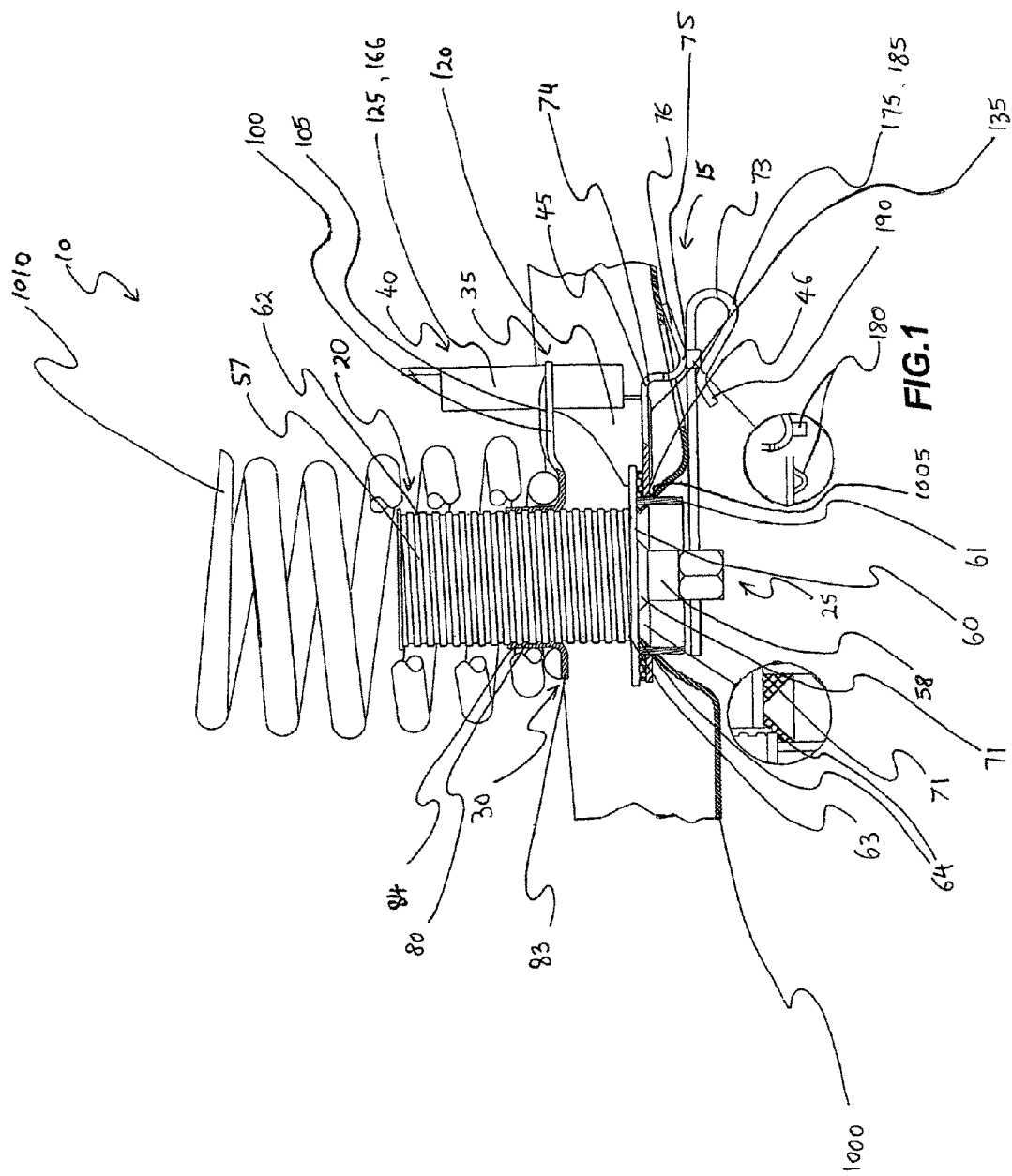
FIG. 1 is a partial cross-sectional side view of a suspension height adjustment mechanism in accordance with a first preferred embodiment of the present invention and of a spring and a portion of a chassis. An inset enlargement of two welds in cross-section is provided as well as an inset enlargement of a locking pin receiving loop from a front and side perspective.
Figure 2:
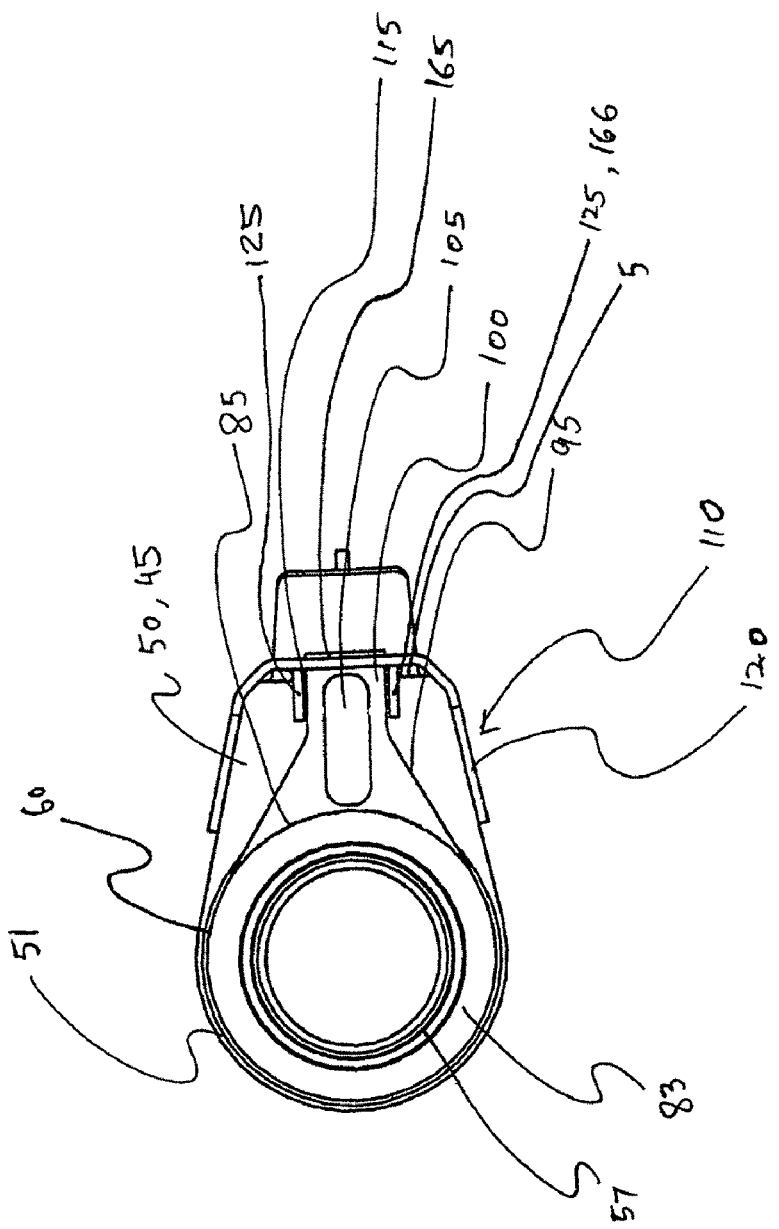
FIG. 2 is a top view of the suspension height adjustment mechanism of FIG. 1.
Figure 3:
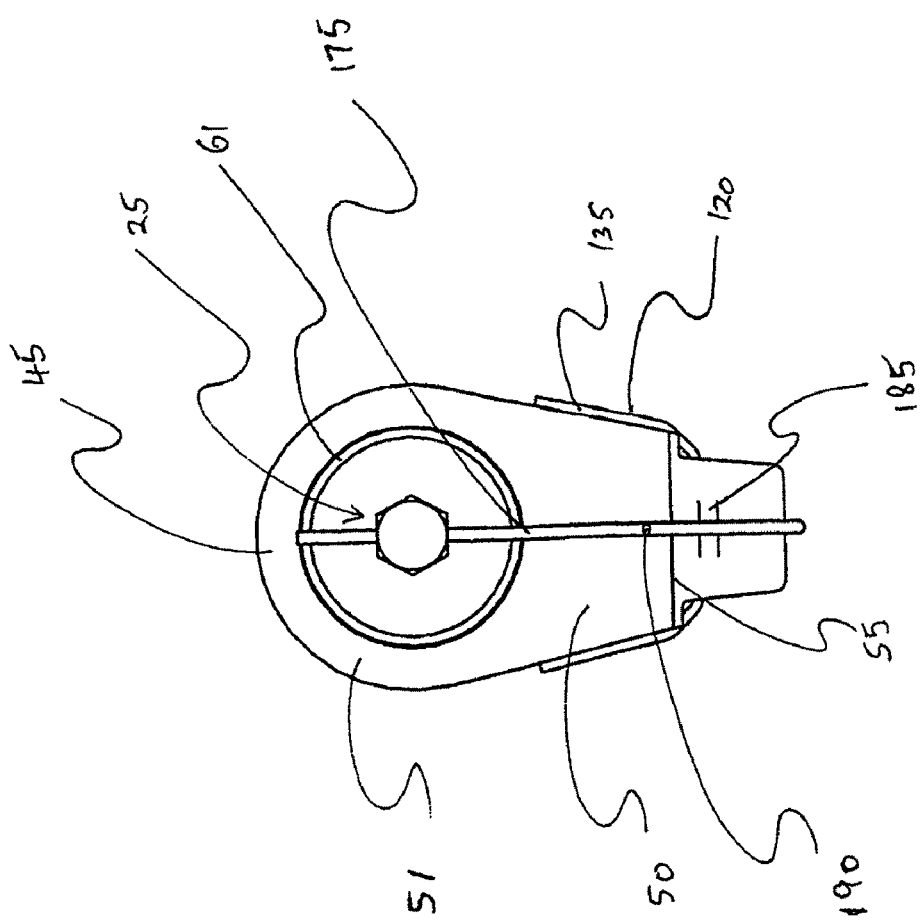
FIG. 3 is a bottom view of the suspension height adjustment mechanism of FIG. 1.
Figure 4:
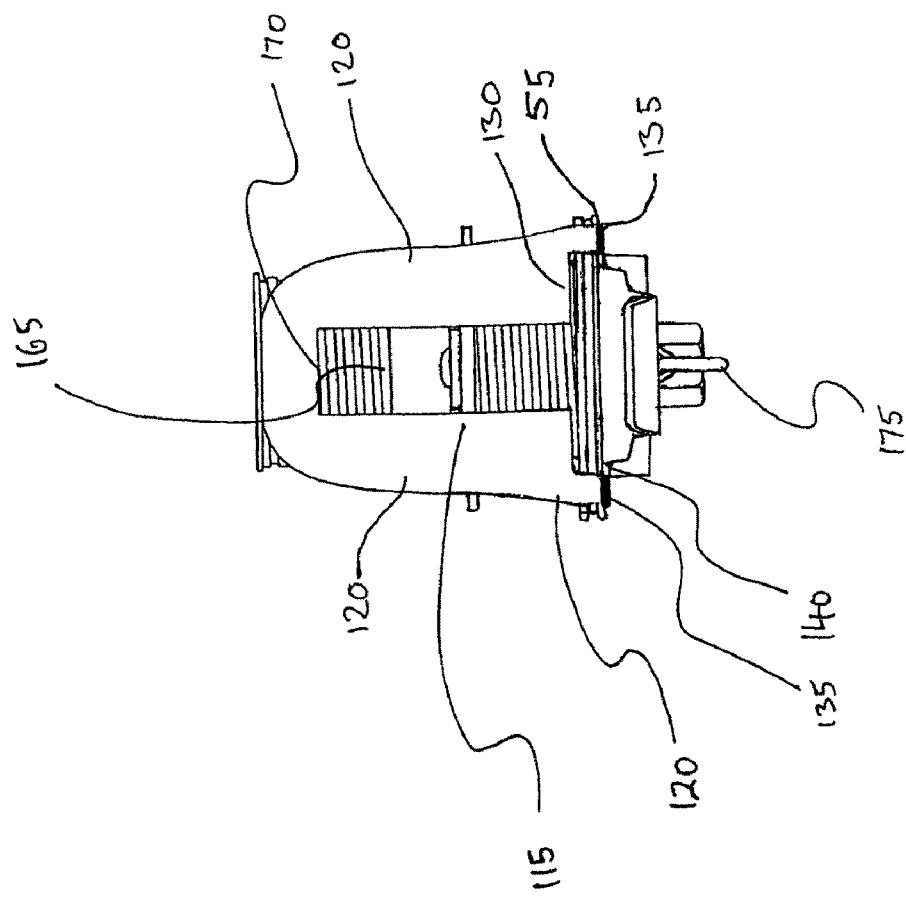
FIG. 4 is a rear view of the suspension height adjustment mechanism of FIG. 1.
Figure 5:
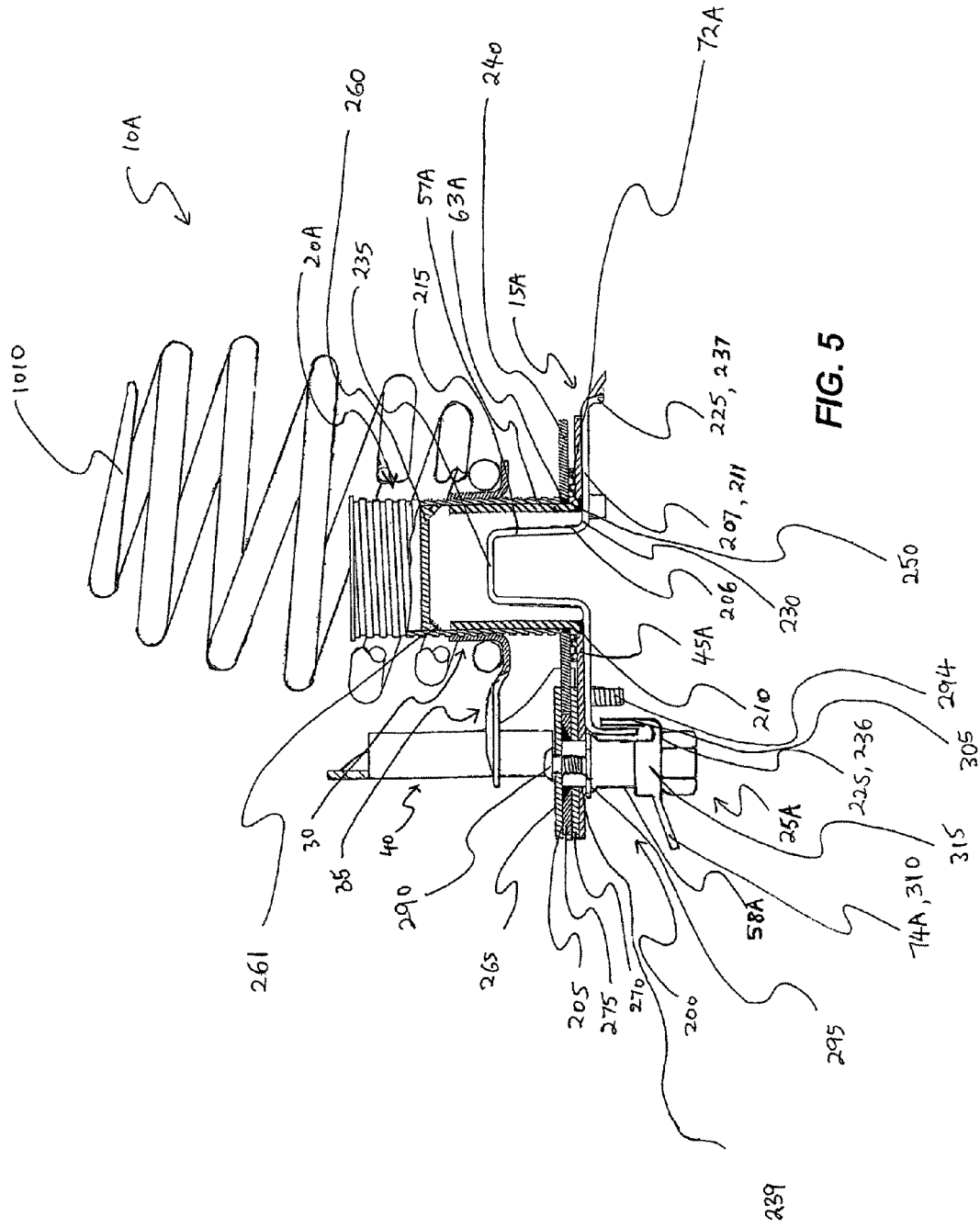
FIG. 5 is a partial cross-sectional side view of a suspension height adjustment mechanism in accordance with a second preferred embodiment of the present invention and of a spring and a portion of a chassis.
Figure 6:
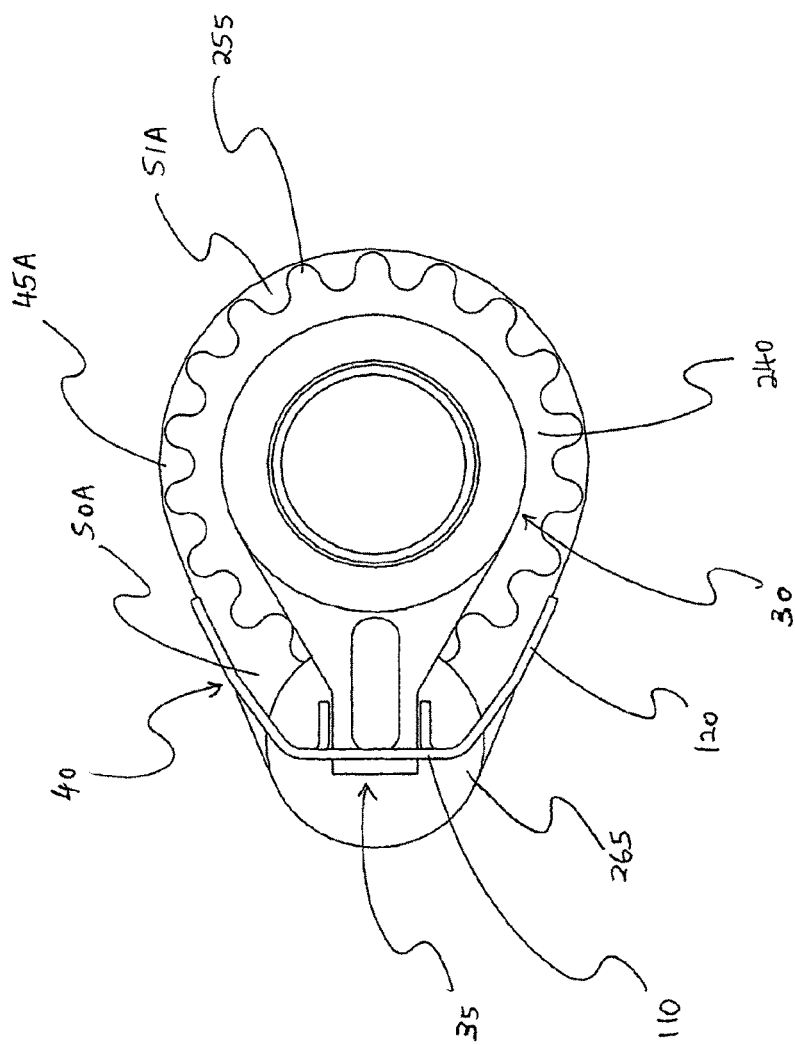
FIG. 6 is a top view of the suspension height adjustment mechanism of FIG. 5.
Figure 7:
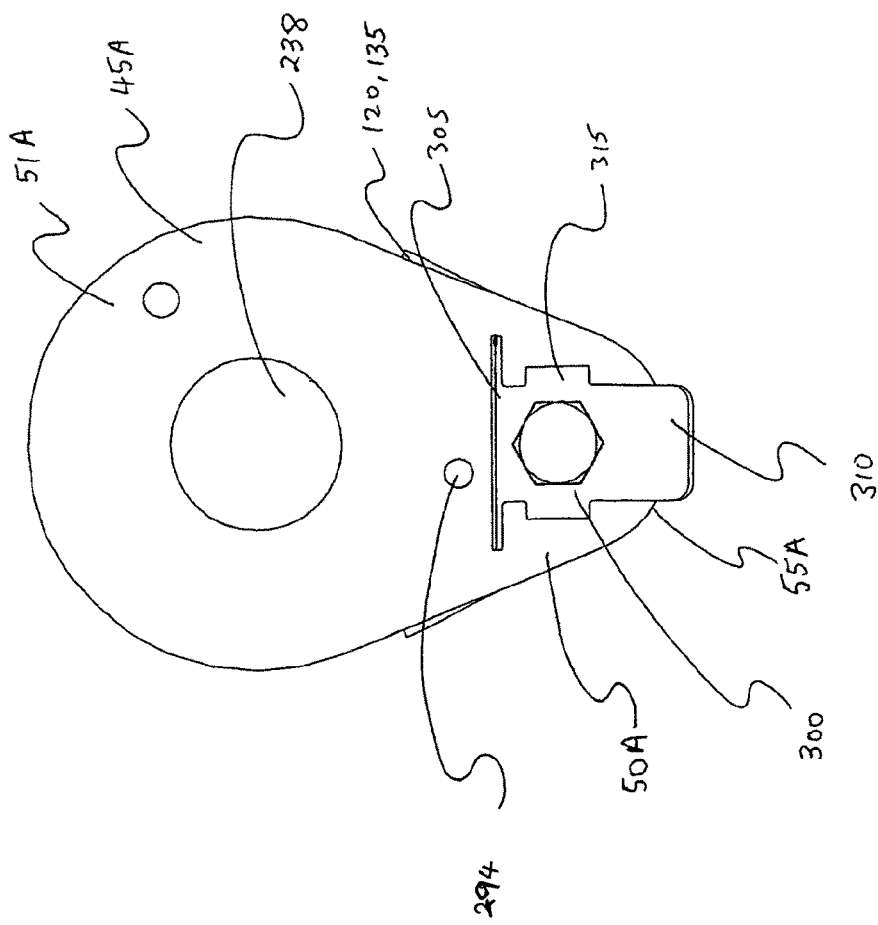
FIG. 7 is a bottom view of the suspension height adjustment mechanism of FIG. 5.
Figure 8:
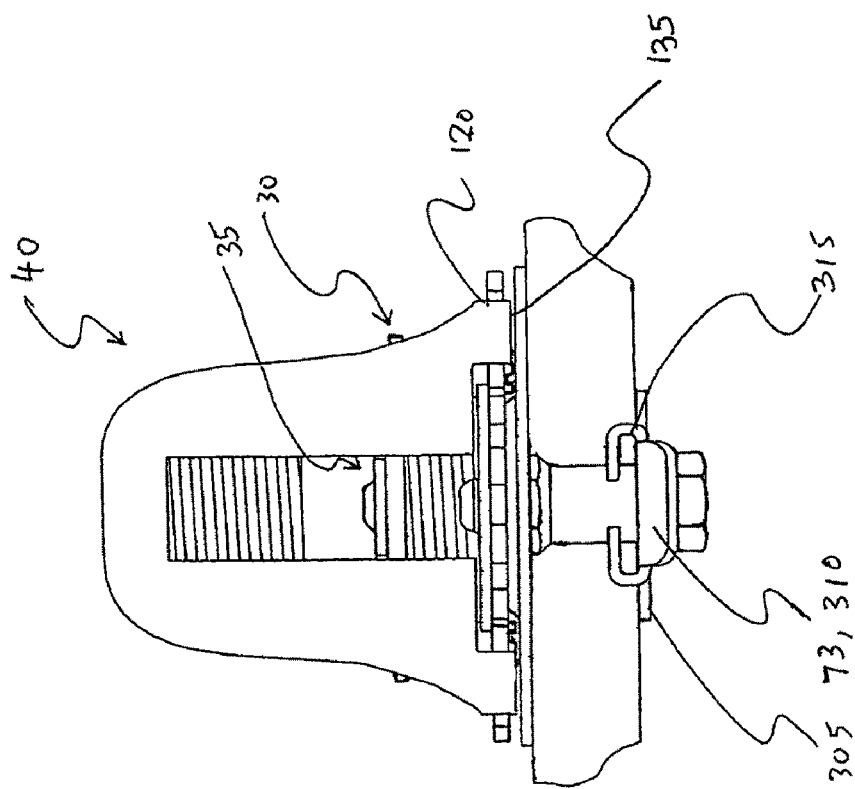
FIG. 8 is a front view of the suspension height adjustment mechanism of FIG. 5.
Figure 9:
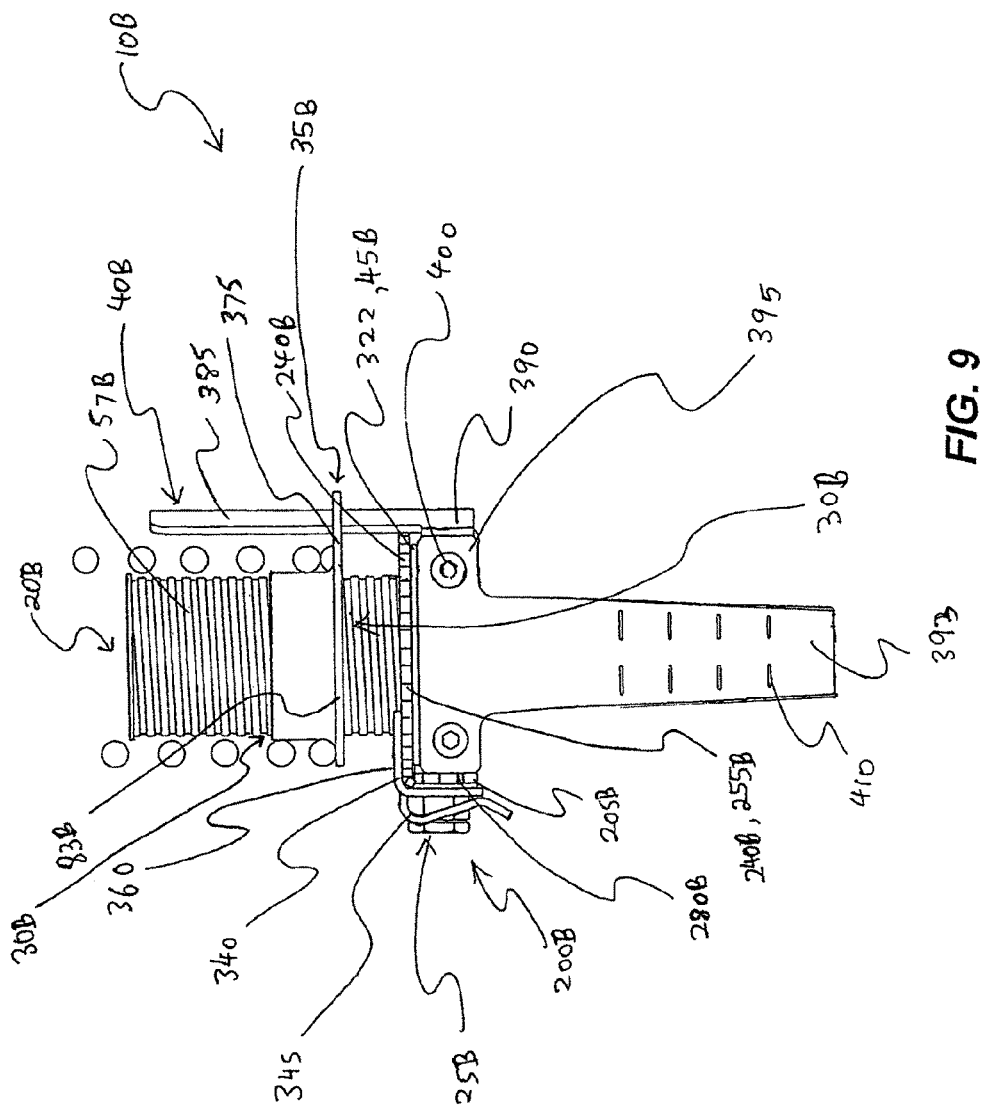
FIG. 9 is a partial cross-sectional side view of a suspension height adjustment mechanism in accordance with a third preferred embodiment of the present invention and of a spring.
Figure 10:
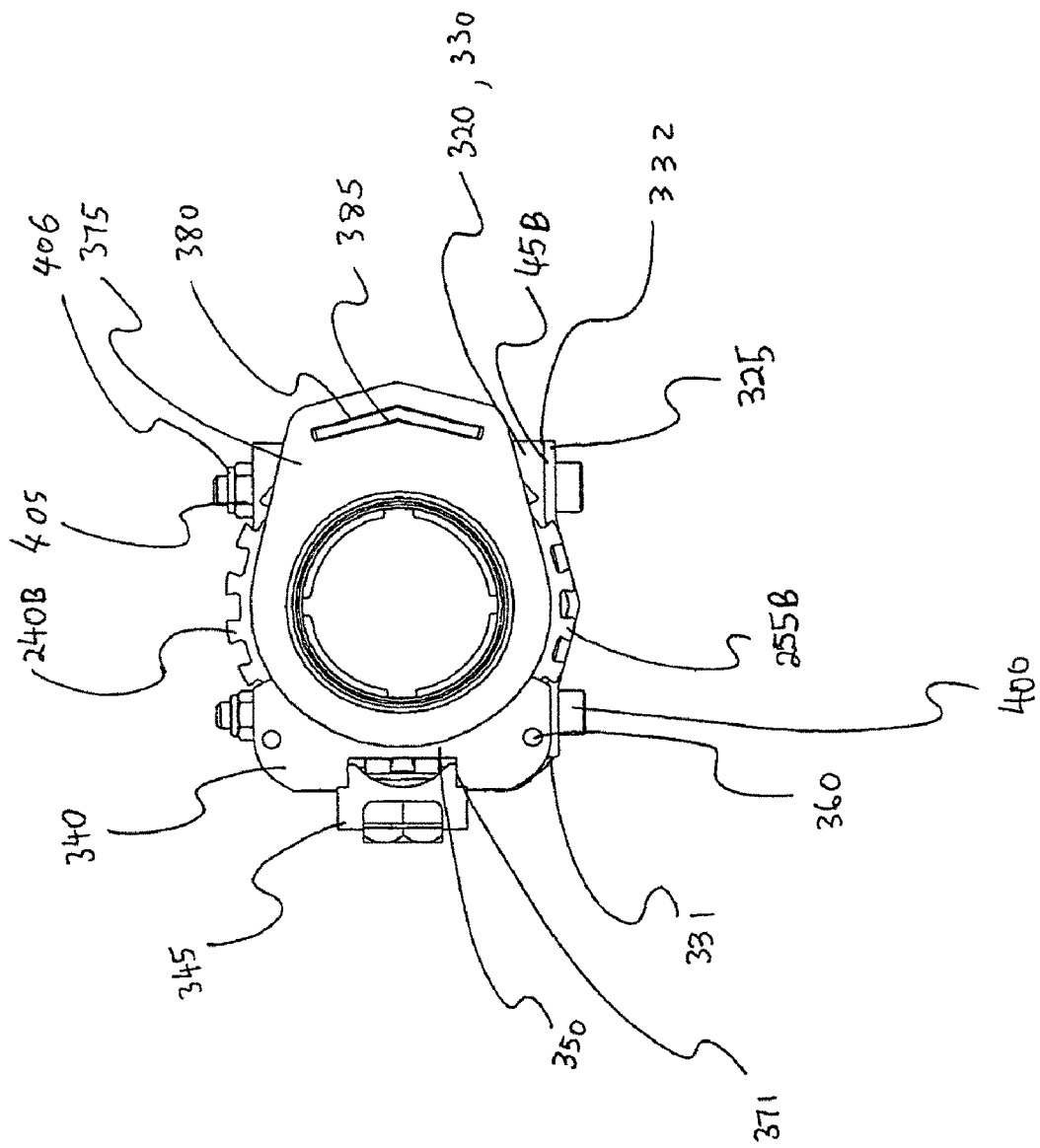
FIG. 10 is a top view of the suspension height adjustment mechanism of FIG. 9.
Figure 11:
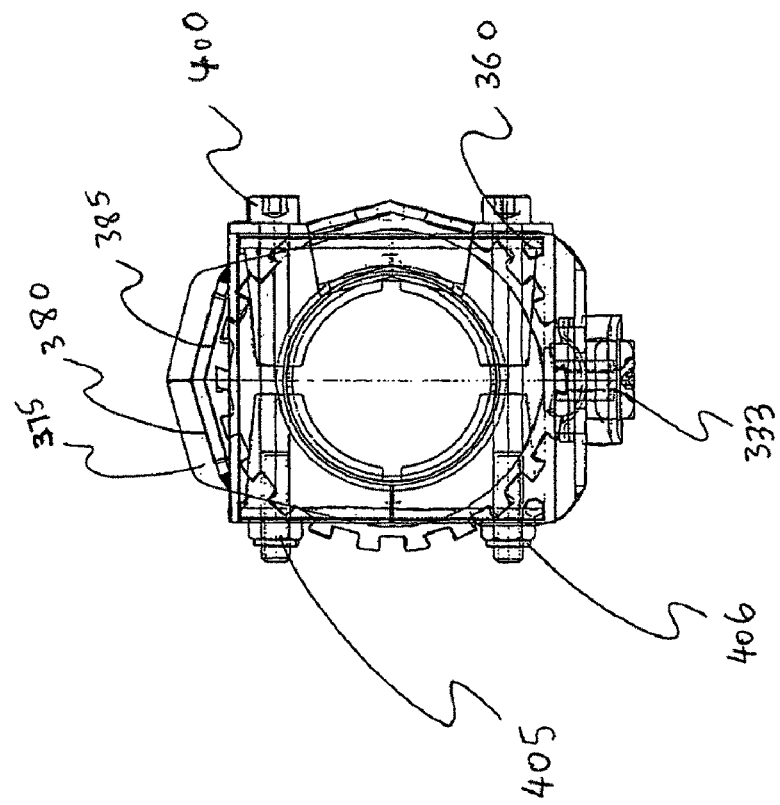
FIG. 11 is a bottom view of the suspension height adjustment mechanism of FIG. 9.
Figure 12:
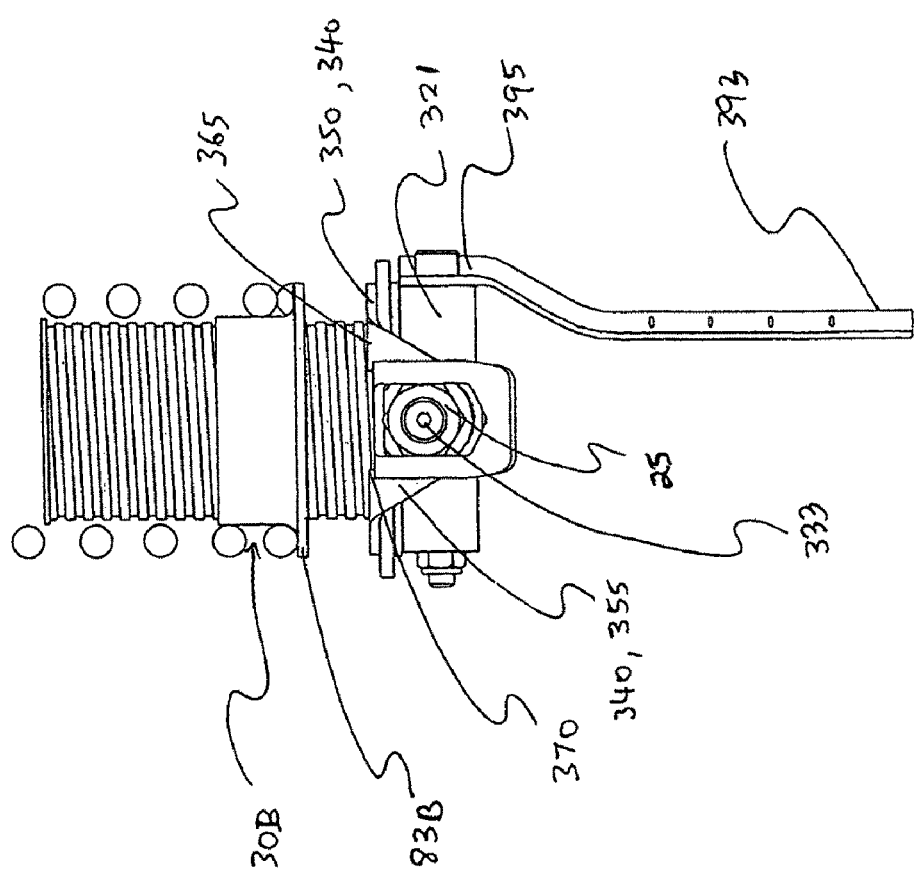
FIG. 12 is a front view of the suspension height adjustment mechanism of FIG. 9.
Figure 13:
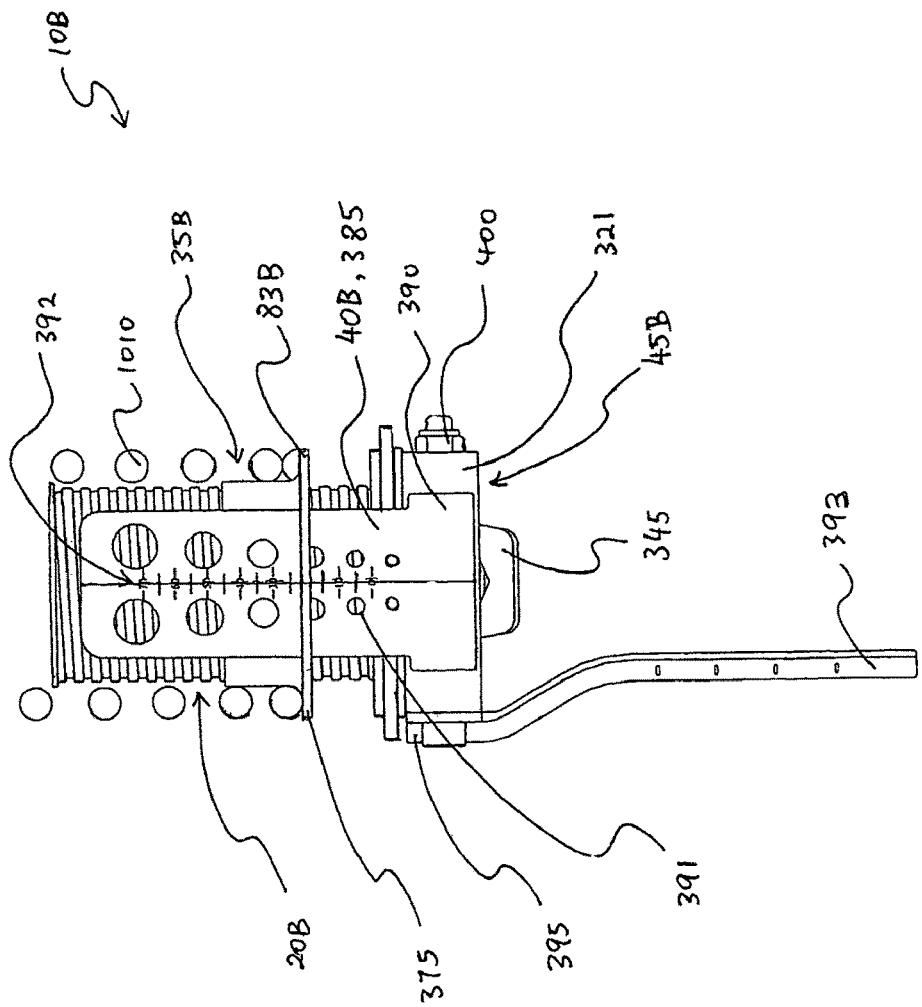
FIG. 13 is a rear view of the suspension height adjustment mechanism of FIG. 9.
Figure 14:
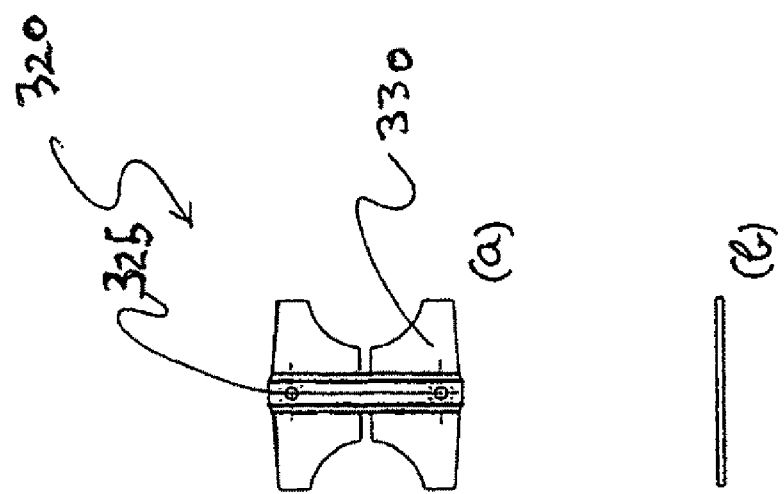
FIG. 14(a) is a top view of a blank of a base portion of the suspension height adjustment mechanism of FIG. 9.
FIG. 14(b) is a side view of the blank of FIG. 14(a)
Figure 15:
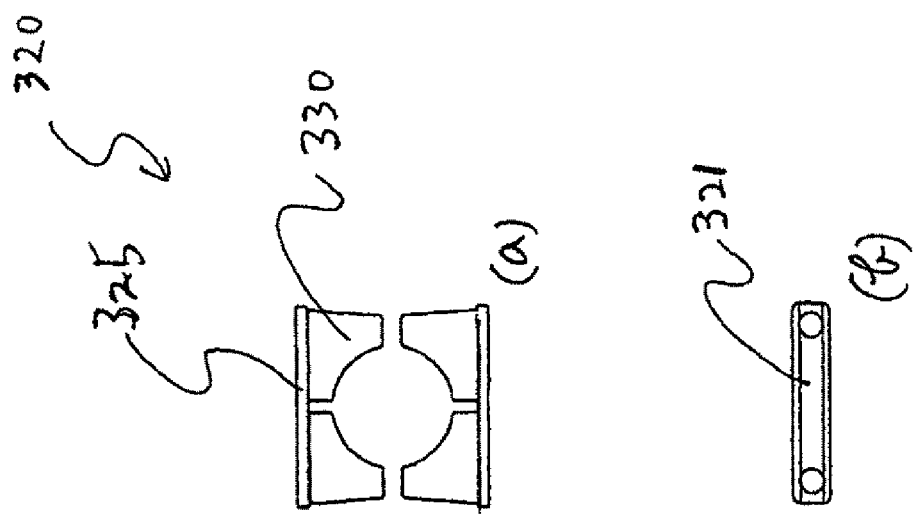
FIG. 15(a) is a top view of a base portion of the suspension height adjustment mechanism of FIG. 9.
FIG. 15(b) is a side view of the base portion of FIG. 15(a)
Figure 16:
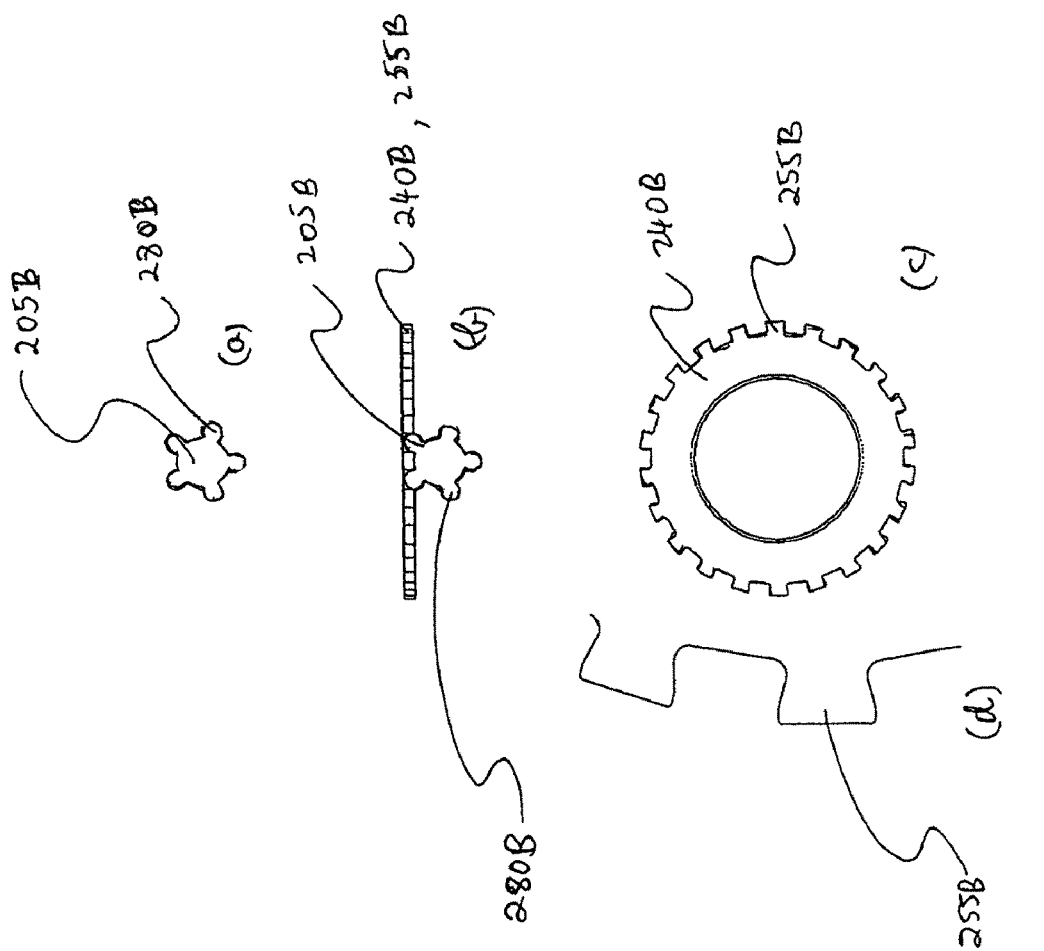
FIG. 16(a) is a front view of the first gear portion of the suspension height adjustment mechanism of FIG. 9.
FIG. 16(b) is a front view of the first gear portion and the second gear portion of the suspension height adjustment mechanism of FIG. 9 in meshing engagement.
FIG. 16(c) is a top view of the second gear portion of the suspension height adjustment mechanism of FIG. 9.
FIG. 16(d) is an enlarged top view of two teeth of the second gear portion of the suspension height adjustment mechanism of FIG. 9.
Figure 17:
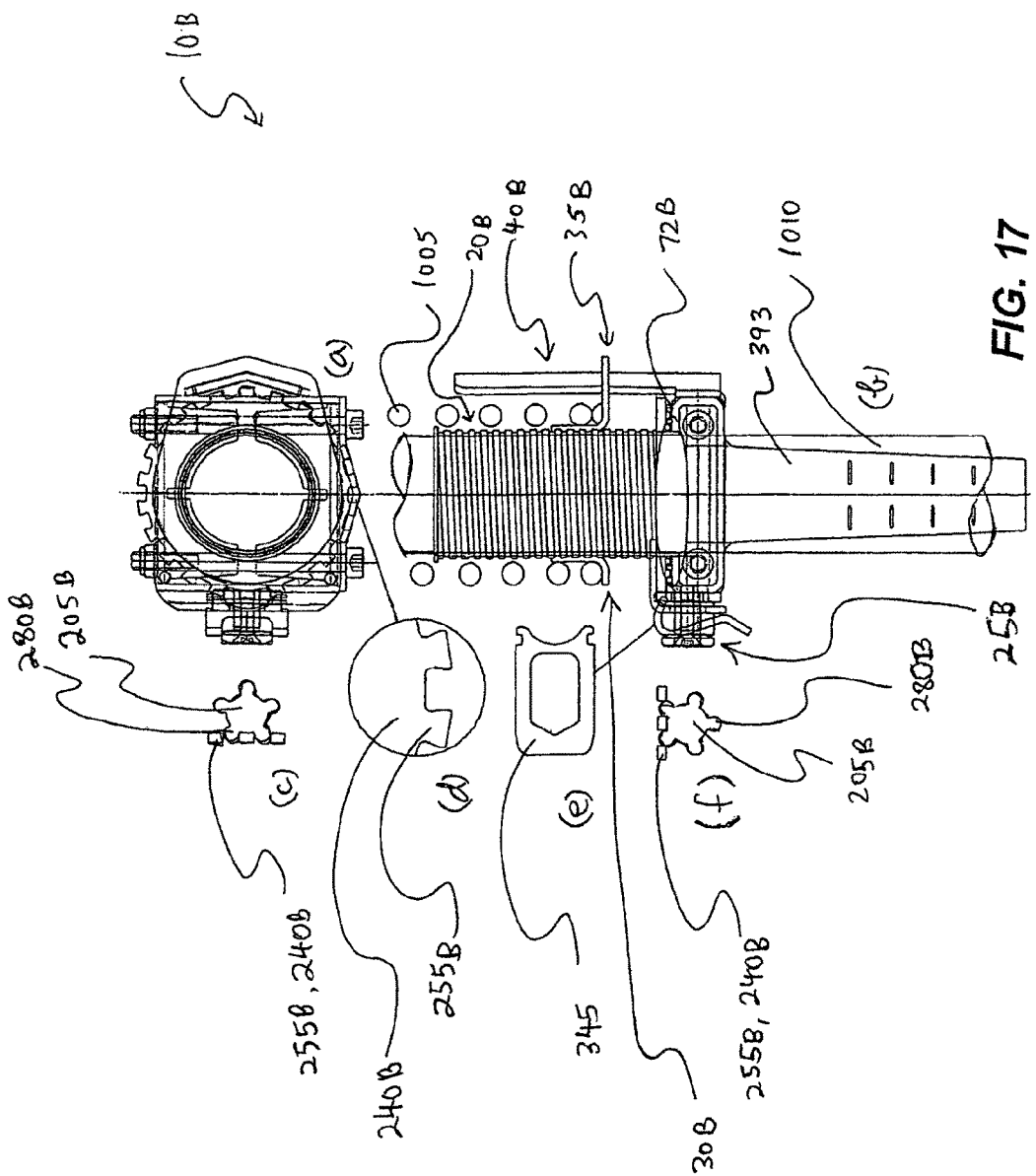
FIG. 17(a) is a top view of the suspension height adjustment mechanism of FIG. 9.
FIG. 17(b) is a side view of the suspension height adjustment mechanism of FIG. 9.
FIG. 17(c) is a front view of the first gear portion and a side view of the second gear portion of the suspension height adjustment mechanism of FIG. 9 in meshing engagement.
FIG. 17(d) is an enlarged top view of two teeth of the second gear portion of the suspension height adjustment mechanism of FIG. 9.
FIG. 17(e) is a top view of a resilient plate of the suspension height adjustment mechanism of FIG. 9.
FIG. 17(f) is a front view of the first gear portion and a side view of the second gear portion of the suspension height adjustment mechanism of FIG. 9 in meshing engagement.

Referring to the drawings, various suspension height adjustment mechanisms are provided in accordance with embodiments of the present invention. The suspension height adjustment mechanisms may be used to vary the height of a vehicle's suspension, for example, in cars, trucks, SUVs or 4WDs.

It should be noted in the following description that like or the same reference numerals in different embodiments denote the same or similar features.

Referring to FIGS. 1 to 4, one embodiment of a suspension height adjustment mechanism 10 is shown and comprises a main body 15, a rotatable assembly 20, a tool engagement portion 25, a spring support 30, an anti-rotation means 35 on the spring support 30 and a corresponding anti-rotation means 40 mounted to the main body 15.

The rotatable assembly 20 is rotatably mounted to the main body 15 but translationally fixed with respect to the main body 15. The main body 15 comprises a base 45 with a substantially circular aperture 46. When viewed from above, the base 45 takes the form of a compound shape comprising a trapezoidal portion 50 attached at its longer parallel edge to a straight edge of a semicircular portion 51. The base 45 is orientated such that the arc of the semicircular portion 51 is foremost and a shorter parallel edge 55 of the trapezoidal portion 50 is rearmost. The aperture 46 is located in a mid-region of the base 45 such that it is substantially concentric with the semicircular portion 51 of the base 45.

The rotatable assembly 20 comprises a tube 57, a shaft 58, a flat annular platform 60 and a tubular support 61. The constituents of the rotatable assembly 20 are fixedly connected.

The tube 57 comprises a first threaded portion 62 disposed on an outer surface of the tube 57. A circular closing plate (not shown) having a diameter substantially equivalent to an inner diameter of the tube 57 closes a lower end 63 of the tube 57, such that the circular closing plate (not shown) is fixed at its circumference to an inner surface of the tube 57. The circular closing plate comprises a relatively small central aperture. The diameter of the tubular support 61 is smaller than the outer diameter of the annular platform 60 but larger than inner diameter of the annular platform 60, and centrally depends from the undersurface of the annular platform 60. The lower end 63 of the tube 57 slots a small distance into the inner diameter of the annular platform 60 without completely penetrating through, such that the tube 57 is located substantially above the annular platform 60. The tube 57, the circular closing plate, the annular platform 60 and the tubular support 61 are all fixed relative to each other by an outer circumferential weld 64.

The shaft 58 is axially aligned with the tube 57, and comprises a short protrusion (not shown) having a smaller diameter than the shaft 58, that fits within the central aperture of the circular closing plate, such that the shaft 58 is substantially located within the tubular support 61. The shaft 58 is fixed to the circular closing plate by an inner circumferential weld 71. The shaft 58 terminates at the tool engaging portion 25, which extends below the tubular support 61.

The tubular support 61 is located within the aperture 46 of the base 45. The relative diameters of the aperture 46, annular platform 60 and tubular support 61 are such that the rotatable assembly 20 is seated in and freely rotatable within the aperture 46. A circumferential outer portion of a bottom surface of the annular platform 60 is located above a corresponding circumferential portion of a top surface of the base 45 and thrust bearings 72 are located in between. The thrust bearings 72 facilitate rotation of the rotatable assembly 20 relative to the base 45.

The base 45 is mounted to a top surface of the interior of the chassis 1000 such that the aperture 46 is substantially aligned with a corresponding aperture 1005 in the chassis 1000. The tubular support 61 extends through the aperture 46 and the aperture 1005 and is freely rotatable within both apertures 45 and 1005. The tool engagement portion 25 is located exterior to the chassis 1000. Rotation of the tool engagement portion 25 causes the rotatable assembly 20 to rotate with respect to the main body 15.

The base 45 further comprises a stabilizing plate 74 located rearwardly to the trapezoidal portion 50. When viewed from above, the stabilizing plate 74 has a regular trapezoidal shape having a longer parallel edge and a shorter parallel edge. The longer parallel edge of the plate 74 is integral with the shorter parallel edge 55 of the trapezoidal portion 50 and comprises a substantially perpendicularly downward bend and a more gradual bend 75 forming a hooking portion 76 that extends through a slot in the chassis 1000 and contacts an exterior surface of the chassis 1000 to stabilize the base 45 with respect to the chassis.

The spring support 30 comprises a tube portion 80 and an integral, circumferential, plate-like flange 83 extending around an outer surface of the tube portion 80. The circumferential flange 83 has a diameter sufficient to support a base of a spring 1010 while the tube portion 80 has a diameter sufficient to be located within the spring 1010. The tube portion 80 comprises a second threaded portion 84 disposed on an inner surface thereof and adapted to engage the first threaded portion 62.

The anti-rotation means 35 takes the form of a plate-like tongue 35 integral with a rear arc 85 of an external edge of the circumferential flange 80 and extends rearwardly. Two side edges 95 of the tongue 35 converge from the rear arc 85 to meet a narrower rectangular portion of the tongue 35 which forms the anti-rotation engaging portion 100. A top surface of the tongue 35 comprises an obround embossment 105 to increase torsional strength.

The corresponding anti-rotation means 40 is formed from a folded plate 110 and comprises a back portion 115, two shielding wings 120 and a corresponding anti-rotation engaging portion 125. The wings 120 are located on either side of the back portion 115 and, when viewed from above, form a generally forward facing U-shape in conjunction with the back portion 115. Each of the wings 120 is orientated at approximately 110 degrees to the back portion and is directed towards the rotatable assembly 20 when viewed from above.

A bottom edge 135 of the wings 120 are welded to respective side edges of the trapezoidal portion 50 such that the folded plate extends substantially perpendicularly upwardly with respect to a top surface of the base 45. The stabilizing plate 74 extends rearward of the corresponding anti-rotation means 40.

A rectangular bottom strip 160 of the back portion 115 is removed such that a bottom edge 140 of the back portion 115 is located relatively higher than the bottom edge 135 of the wings 120 and does not contact the base 45. The bottom edge 140 of the back portion 115 is located above the shorter parallel edge 55 of the trapezoidal portion 50. The corresponding anti-rotation engaging portion 125 is formed from a rectangular mid-region 165 of the back portion 115. The rectangular mid-region 165 is subjected to an I-shaped through-cut forming two inner wings 166 which are bent towards the rotatable assembly 20 until they are parallel to each other.

The dimensions of the inner wings 166 are such that the corresponding anti-rotation engaging portion 125 receives the anti-rotation engaging portion 100 of the tongue 35. Engagement of the anti-rotation engaging portion 100 and the corresponding anti-rotation engaging portion 105 substantially constrains lateral translation of the tongue 35 with respect to the folded plate 110 and hence prevents rotation of the spring support 30 around the rotatable assembly 20. The spring support 30 is further constrained in terms of upward vertical movement relative to the rotatable assembly 20 by a top end 170 of the corresponding anti-rotation engaging portion 125.

The suspension adjustment mechanism 10 further comprises a crook-shaped locking pin 175 and a locking pin receiving loop 180. The crooked portion of the locking pin 175 is bent over onto itself to form an enclosed loop 185. A rear tip 190 of the rod is bent away from the straight portion of the pin 175. The locking pin receiving loop 180 comprises a substantially U-shaped rod attached at its ends to a bottom surface of the hooking portion 76 of the stabilizing plate 74 such that it forms an enclosed aperture. The tool engagement portion 25 further comprises a corresponding aperture (not shown) level with the locking pin receiving loop 180 such that the locking pin 175 may be passed through both apertures to substantially stop rotation of the tool engagement portion 25 and hence of the rotatable assembly 20, when the height adjustment mechanism is not in use. The receiving loop 180 is adapted to receive the rear tip 190 and direct it past where the crooked portion contacts the straight portion of the pin 175 and into the enclosed loop 185.

The suspension adjustment mechanism 10 may be used for varying the height of a spring, such as the suspension spring 1010 of a vehicle. The main body 15 is adapted to be mounted to the chassis 1000 of a vehicle directly below a suspension spring 1010. The suspension adjustment mechanism 10 is substantially located within the chassis 1000 of the vehicle, except for the tubular support 61, the shaft 58, the tool engagement portion 25, the hooking portion 76 of the stabilizing plate 74 and the locking pin 175.

The engagement of the first and second threaded portions 62 and 71 allows the spring support 30 to rotate with respect to the rotatable assembly 20 and translate axially with respect to the rotatable assembly 20 as rotation occurs. However, since the spring support 30 is rotationally fixed with respect to the main body 15 by virtue of the anti-rotation means 35 and the corresponding anti rotation means 40, rotation of the tool engagement portion 25 causes the spring support 30 to translate up or down the tube 57 of the rotatable assembly 20.

Furthermore, since the circumferential flange 83 of the spring support 30 supports a bottom turn of the suspension spring 1010, translation of the spring support 30 adjusts the height of the suspension spring 1010. Hence the height of the suspension can be varied by simply rotating the tool engagement portion 25.

Once the desired height is achieved, engagement of the locking pin 175 with the locking pin receiving loop 180 and the aperture on the tool engagement portion 25 substantially prevents any further unwanted rotation (e.g. when the vehicle is being driven), thus fixing the suspension spring 1000 at the desired height.

The tube 57 of the rotatable assembly 20 potentially allows a dampener or a portion of a dampener to be located within its hollow centre.

Advantageously, embodiments of the adjustment mechanism provide a simplified suspension height adjustment arrangement. The adjustment mechanism can be easily used since adjustment is achieved merely by turning of the tool engagement portion 25. Adjustment can be even more readily achieved with the use of tools, for example, a fast ratchet wrench adjustment, air impact wrench, 24 volt impact wrench, standard or compact ratchet wrench, electric or pneumatic powered nut running tool or by an active suspension system having its own motorized driving unit, the settings of which can be controlled from inside the vehicle in one embodiment. This considerably reduces the adjustment time and physical effort involved in adjusting the suspension and simplifies the adjustment process.

A second advantage of embodiments of the adjustment mechanism is that the suspension system in most instances does not need to be raised or jacked up and the wheels removed before adjustment can take place, as the tool engagement portion 25 is conveniently located to provide easy access.

A third advantage of embodiments of the adjustment mechanism is that use of a special 'C' wrench followed by a lock ring is not required to adjust the suspension height and thus associated labor can be avoided.

A fourth advantage of embodiments of the invention is that the tool engagement portion, being smaller than prior art collars, can be turned by a less bulky tool. Thus, the tool engagement portion is easier to access.

Referring to the embodiment of FIGS. 5 to 8, a suspension adjustment mechanism 10A is shown and further comprises an auxiliary assembly 200. The auxiliary assembly 200 comprises a shaft 58A and a first gear portion 205, and is arranged such that a common axis of rotation of a tool engagement portion 25A and the shaft 58A is parallel to and forwardly located in relation to an axis of rotation of a rotatable assembly 20A.

In this embodiment, a main body 15A comprises a base 45A, a tubular, upright support 206 and an under support 207. An outer diameter of the upright support 206 is smaller than the inner diameter of the tube 57A of the rotatable assembly 20A such that the rotatable assembly 20A can freely rotate around it. A bottom edge 210 of the upright support 206 is welded to a top surface of an annular portion 211 of the under support 207.

The under support 207 comprises a hollow centre protrusion 215, the annular portion 211 integrally surrounding the protrusion 215, and a downward circumferential flange 225 integral with the annular portion 211. The protrusion 215 extends upwardly from the annular portion 211 and is generally cylindrical. A bottom edge 230 of the protrusion 215 is integral with the annular portion 211 and a top end 235 is closed. An outer diameter of the protrusion 215 is smaller than the inner diameter of the upright support 206 such that the protrusion 215 is comfortably housed within the upright portion 206. A front portion 236 of the circumferential flange 225 is longer than a rear portion 237.

The base 45A of this embodiment takes a similar form to the base 45 of the embodiment of FIGS. 1 to 4 and similarly comprises a trapezoidal portion 50A attached at its longer parallel edge to a straight edge of a semicircular portion 51A. The base 45A of this embodiment differs in that the trapezoidal portion 50A has rounded edges, and the base 45A is orientated such that the arc of the semicircular portion 51A is rearmost and the shorter parallel edge 55A of the trapezoidal portion 50A is foremost. The base 45A comprises a larger aperture 238 located at a substantially centre region of the semicircular portion 51A and a smaller aperture 239 located at a front portion of the base 45A forwards of the annular portion 211. The bottom edge 210 of the upright support 206 is welded to an inner edge of the larger aperture 238. A portion of a bottom surface of the base 45 abuts a portion of the top surface of the annular portion 211 of the under support 207. The smaller aperture 239 is adapted to receive the shaft 58.

A lower end 63A of a tube 57A of the rotatable assembly 20A is open in this embodiment. The upright support 206 is substantially housed within the tube 57A. The upright support 206 supports the rotatable assembly 20A in an upright position, preventing the rotatable assembly 20A from being displaced relative to the base 45A and allowing the rotatable assembly 20A to freely rotate.

The rotatable assembly 20A further comprises an annular, plate-like second gear portion 240, comprising a centre aperture. An inner edge 250 of the second gear portion 240 is welded circumferentially to an outer surface of the lower end 63A of the tube 57A of the rotatable assembly 20A such that rotation of the second gear portion 240 causes the tube 57A to rotate. The second gear portion 240 further comprises a first set of teeth 255 disposed circumferentially around an outer edge of the second gear portion 240.

The second gear portion 240 is located above the base 45A and thrust bearings 72A are located intermediate a bottom surface of the second gear portion 240 and a top surface of the base 45A. The second gear portion 240 has a smaller diameter than the annular portion 211 of the under support 207.

The rotatable assembly 20A further comprises an inside reinforcement taking the form of a circular plate 260 having a diameter substantially equivalent to an inner diameter of the tube 57A. The circular plate 260 is circumferentially welded 261 to an inner surface of the tube 57A from beneath.

The first gear portion 205 of the auxiliary assembly 200 comprises three substantially concentric, annular plates: an upper constraining plate 265, a lower constraining plate 270 and an intermediate gear plate 275. The intermediate gear plate 275 is located between and has a smaller diameter than the upper and lower constraining plates 265 and 270. The intermediate gear plate 275 has a second set of teeth 280 (not shown) circumferentially disposed and adapted to engage with the first set of teeth 255.

The lower constraining plate 270 and the intermediate gear plate 275 each comprise a central aperture having a diameter substantially the same as the smaller aperture 239 at the front region of the base 45A. An undersurface of the lower constraining plate 270 abuts a portion of the top surface of the base 45A such that the apertures of the lower constraining plate 270 and the intermediate gear plate 275 are aligned with the smaller aperture 239 of the front region of the base 45A.

The diameters and thicknesses of the plates 265, 270 and 275 of the first gear portion 205 and the second gear portion 240 are such that an outer portion of the second gear portion 240 is received in between outer regions of the upper and lower constraining plates 265 and 270. The first set of teeth 255 located on the second gear portion 240 meshes with the second set of teeth 280 (not shown) located on the intermediate gear plate 275.

A top region of the shaft 58A is located within the smaller aperture 239 of the base 45A, the aperture of the lower constraining plate 270 and the aperture of the intermediate gear plate 275. A top end 285 of the shaft 58A is welded to the edges of the apertures of the three annular plates 265, 270 and 275 of the first gear portion 205 such that rotation of the shaft 58A causes the first gear portion 205 to rotate with respect to the main body 15A. A lower region of the shaft 58A is located beneath the base 45a and terminates at the tool engagement portion 25A.

The upper constraining plate 265 comprises a central aperture having a relatively small diameter. A central pin 290 is located through the central aperture of the upper constraining plate 265 and into the top end 285 of the shaft 58A to further fix the shaft 58A to the upper constraining plate 265. A peripheral pin 294 can be located through a rear portion of the lower constraining plate 270 and through a front portion of the base 45 and the under support 207 and can be engaged or disengaged to respectively stop or allow rotation of the first gear portion 205. The pin 294 extends below the under support 207.

Thus, in the abovementioned arrangement, rotation of the tool engagement portion 25A causes the shaft 58A to rotate, which in turn causes the first gear portion 205 to rotate, which causes the second gear portion 240 to rotate by virtue of the meshing of the first and second set of teeth 255 and 280 and hence the rotatable assembly 20A to rotate.

The auxiliary assembly 200 further comprises a nut 295 for tightening the shaft 58A to an underside of the base 45A. The auxiliary assembly 200 further comprises a stabilizing plate 74A attached to the front portion 236 of the circumferential flange 225. The stabilizing plate 74A comprises a mid-portion 300 and four tongues. The mid-portion 300 comprises an aperture for receiving the shaft 58A therethrough. A rear tongue 305 is bent upwardly and substantially perpendicularly to the mid-portion 300. A bottom edge of the front portion 236 of the circumferential flange 225 is attached to the mid-portion 300 such that the rear tongue 305 is located directly rearwardly to the circumferential flange 225. A front tongue 310 is bent downwardly at approximately 20 degrees with respect to the mid-portion 300. Two side tongues 315 on either side of the mid-portion 300 are bent upwardly and inwardly such that the curved ends of the side tongues 315 partially surround the shaft 58A laterally.

The anti-rotation means 35 and the corresponding anti-rotation means 40, in this embodiment, are located to the front of the spring support 30 and the rotatable assembly 20A. The corresponding anti-rotation means 40 is mounted substantially over the first gear portion 205. The spring support 30, the anti-rotation means 35 and the corresponding anti-rotation means 40 have similar configurations to the embodiment of FIGS. 1 to 4 and engage in the same way. Bottom edges 135 of the wings 120 of the folded plate 110 of the corresponding anti-rotation means 40 are welded to a side edge and/or top surface the base 45A. The rectangular bottom strip 160 of the back portion 115 is sufficiently high and wide so that the folded plate 110 does not contact with the first gear portion 205 or interfere with its rotation.

The auxiliary assembly 200 allows the tool engagement portion 25A to be located at a position other than axially in-line with the rotatable assembly 20A. The additional structure supporting the main body 15A maintains structural integrity, stability and rotatability.

Advantageously, this embodiment can be fitted in vehicles where there is no direct access below or above (depending on the orientation of the suspension) the suspension spring 1010. Thus the suspension spring 1010 may still be adjusted without the need to jack the car for access.

Referring to the embodiment of FIGS. 9 to 17, a suspension adjustment mechanism 10B is shown. In this embodiment, a base 45B takes the form of two opposing folded blanks 320, two enclosing plates 321 and a top plate 322. Each folded blank 320 comprises an end-plate 325 and four quarter pieces 330 comprising a top pair of quarter pieces and a bottom pair of quarter pieces. Each quarter piece 330 takes the form of a generally square plate with an arcuate cut-away from one corner of the square. One complete straight edge of each quarter piece 330 of the top pair of quarter pieces 330 is integral with a top edge of the end-plate 325 and extends perpendicular to the end-plate 325. The bottom pair of quarter pieces 330 is similarly integral with the end-plate 325 at a bottom edge. Each pair of quarter pieces 330 are arranged such that the cut-away corners are located adjacent to each other, with a relatively small gap intermediate, such that a semicircular cut-out is formed. When the two folded blanks 320 are positioned opposingly with a small gap intermediate, a generally circular aperture is formed. The two folded blanks 320 are orientated such that the two end-plates 325 face substantially laterally. The two enclosing plates 321 are generally rectangular and connect to front and rear edges 331 and 332 of the folded blanks 320 respectively, to form a front face and a rear face of the base 45A. The top plate 322 takes the form of a generally square plate comprising a central aperture. The top plate 322 abuts a top surface of the two folded blanks 320 such that the central aperture is aligned with the aperture produced by the quarter pieces 330. A left end-plate arches outwardly in a mid-region to help protect a second gear portion 240B.

A rotatable assembly 20B comprises a tube 57B and the second gear portion 240B in a similar configuration to the embodiment of FIGS. 5 to 8. The second gear portion 240B is located above a top surface of the top plate 322 of the base 45B. Thrust bearings 72B (not shown) are located intermediate the bottom surface of the second gear portion 240B and the top surface of the base 45B.

An auxiliary assembly 200B comprises the first gear portion taking the form of a first gear plate 205B with a circumferentially disposed set of teeth 280B. A tool engagement portion 25B is attached substantially concentrically to the first gear portion 205B. A pin 333 located substantially through the concentric centers of the tool engagement portion 25A and the first gear portion 205B and rotatably joins the auxiliary assembly 200B to the front enclosing plate 321 of the base 45B, such that the first gear portion 205B abuts the front enclosing plate 321 and is orientated substantially perpendicularly with respect to the second gear portion 240B. The diameters of the first and second gear portions 205B and 240B are such that the set of teeth 280B of the first gear portion 205B and a set of teeth 255B of the second gear portion 240B mesh at right angles and rotation of the first gear portion 205B causes the second gear portion 240B to rotate. In another embodiment, the auxiliary assembly 200B comprises a worm drive arrangement, in which the second gear portion 240B takes the form of a worm gear.

A bent fixture plate 340 and a locking collar 345 are provided. The bent fixture plate 340 has a compound shape of an altered rectangular portion 350 and a rounded triangular portion 355 substantially bent at a right angle to the altered rectangular portion 350 and integral with one long edge 356 of the rectangular portion 350. The altered rectangular portion 350 comprises a rectangle with an arcuate cut-out at the other long edge of the rectangle. The altered rectangular portion 350 is orientated substantially laterally with respect to the base such that the cutaway edge is located rearwardly and has a diameter sufficient to partially encircles the tube 57B of the rotatable assembly 20B without contact. The rectangular portion 350 is located above the second gear portion 240B but is fixed only to the vertices of the top plate 322 of the base 45B by virtue of two screws 360.

The bent fixture plate 340 comprises a compound aperture 370 having a rectangular aperture portion 371 connected to a circular portion 372 (not shown). The circular aperture portion 372 is located in the triangular portion 355 and is sized to fit over the tool engagement portion 25B. The triangular portion 355 is located adjacent to but without contacting the first gear portion 205B.

The locking collar 345 takes a generally S-shaped form and comprises an aperture. The locking collar 345 comprises two lateral notches adapted to connect to the bent fixture plate 340 at the rectangular aperture portion 371. The aperture of the locking collar 345 is sized to receive the tool engagement portion 25B but to stop it rotating. A rear edge of the locking collar 345 comprises an arcuate cut-out sized so that the locking collar 345 does not contact or interfere with the first or second gear portions 205B and 240B. The locking collar 345 can be rotated upwards to allow rotation of the tool engagement portion 25B in use.

In this embodiment, an anti-rotation means 35B is formed from an extended rear portion 375 of a circumferential flange 83B of a spring support 30B. An arrowhead shaped slot 380 is located in the extended rear portion 375. The slot takes the form of a shallow arrowhead pointing to the rear, when view from the top. A corresponding anti-rotation means 40B comprises a vertically orientated plate 385 bent with along a vertical mid-line at an angle such that the plate 385 can slide vertically through the slot 380. The plate 385 comprises two wings 390 at a bottom end, connected to a rear enclosing plate 321 of the base 45B. The vertically orientated plate 385 further comprises a number of apertures 391 aligned vertically in two columns for weight reduction and height indication marks 392 aligned vertically in between the two columns of apertures 391 for gauging the height of the suspension.

A main body 15B of this embodiment further comprises a support bracket 393. The support bracket 393 takes the form of a T-shaped plate. A top portion 395 forming a top lateral portion of the T-shape has a similar shape and size to the end-plates 325 and is bolted to the end-plate 325 on the left-hand side of the base 45B by first and second bolts 400. Each bolt 400 extends through the space between the top and bottom pairs of quarter pieces 330 to the opposing end plates 325. Each bolt 400 is secured with a nut 405 and a washer 406 on the end-plate 325 on the right-hand side of the base 45B. A lower portion 400 forming a stem portion of the T-shape is relatively longer than and is integral with the top portion 395, and gradually narrows downwardly. A bottom of the lower portion 400 rests on a base of the dampener (not shown) to support a downward load. The support bracket 393 further comprises evenly spaced slits 410 to allow a hacksaw entry to simplify cutting of the support bracket 393 to adjust its height. Thus, the support bracket 393 can be provided in a universal length which can be modified depending on the height required.

The auxiliary assembly 200B allows the tool engagement portion 25B to be orientated laterally and thus located at a position and orientation other than axially of the rotatable assembly 20B. The supporting structure of the main body 15B maintains structural integrity, stability and allows the rotatable assembly 20B to rotate.

All of the parts of the suspension adjustment mechanism 10B aligned with the axis of the rotatable assembly 20B are adapted such that a dampener 1015 may be housed through them.

Advantageously, this embodiment can be fitted in vehicles where there is no direct access underneath or above the suspension spring 1010. Thus, the suspension spring 1010 may still be adjusted without the need to jack the car for access. Furthermore, having access to the suspension adjustment mechanism 10 from the side rather than from beneath makes it easier for the user to perform the adjustment.

Figure 18:
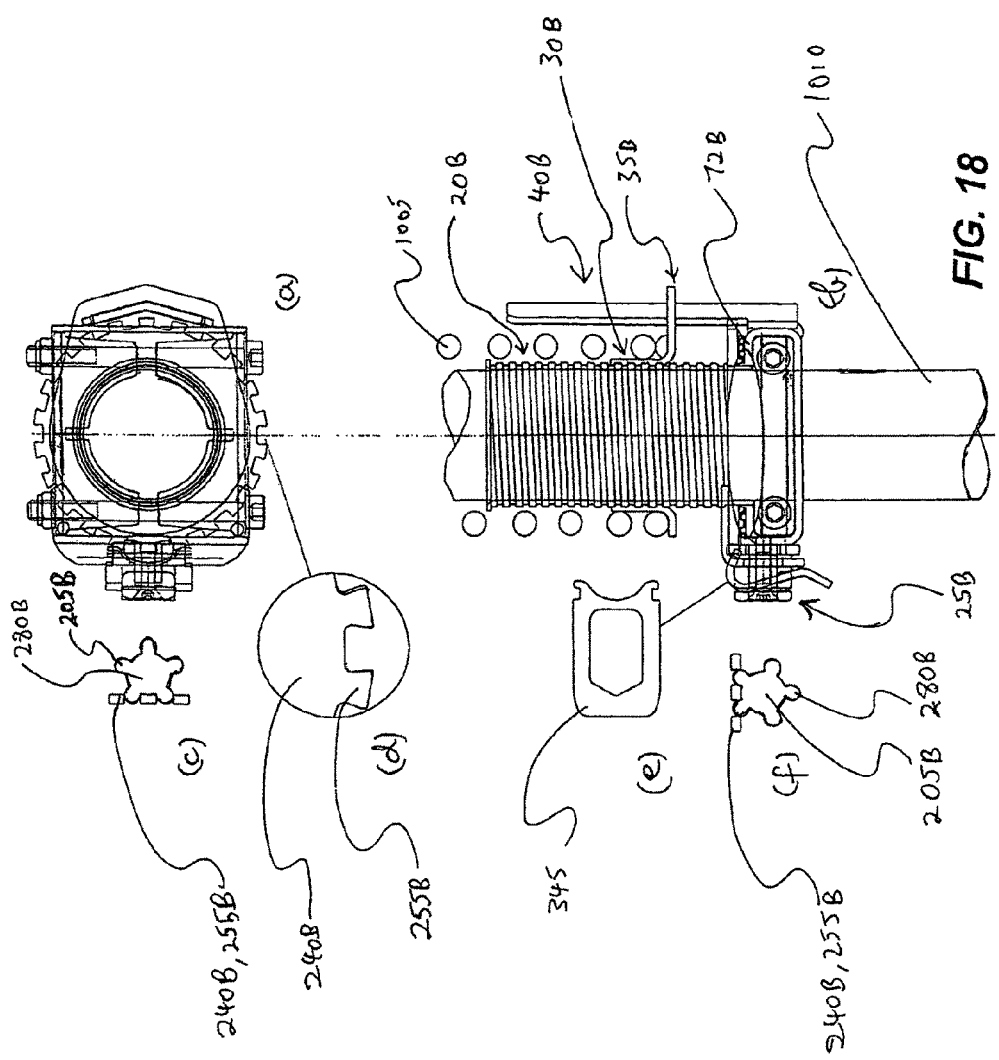
FIG. 18(a) is a top view of a suspension height adjustment mechanism in accordance with a fourth preferred embodiment of the present invention.
FIG. 18(b) is a side view of the suspension height adjustment mechanism of FIG. 18(a)
FIG. 18(c) is a front view of a first gear portion and a side view of the second gear portion of the suspension height adjustment mechanism of FIG. 18(a) in meshing engagement.
FIG. 18(d) is an enlarged top view of two teeth of a second gear portion of the suspension height adjustment mechanism of FIG. 18(a)
FIG. 18(e) is a side view of a resilient plate of the suspension height adjustment mechanism of FIG. 18(a)
FIG. 18(f) is a front view of the first gear portion and a side view of the second gear portion of the suspension height adjustment mechanism of FIG. 18(a)

In another embodiment depicted in FIG. 18, the main body 15 is fixed to the dampener 1010 without the need for the support bracket 393 by virtue of the base 45 being bolted to the dampener 1015.

Advantageously, this embodiment is able to be retrofitted or provided as an aftermarket alternative.

Figure 19:
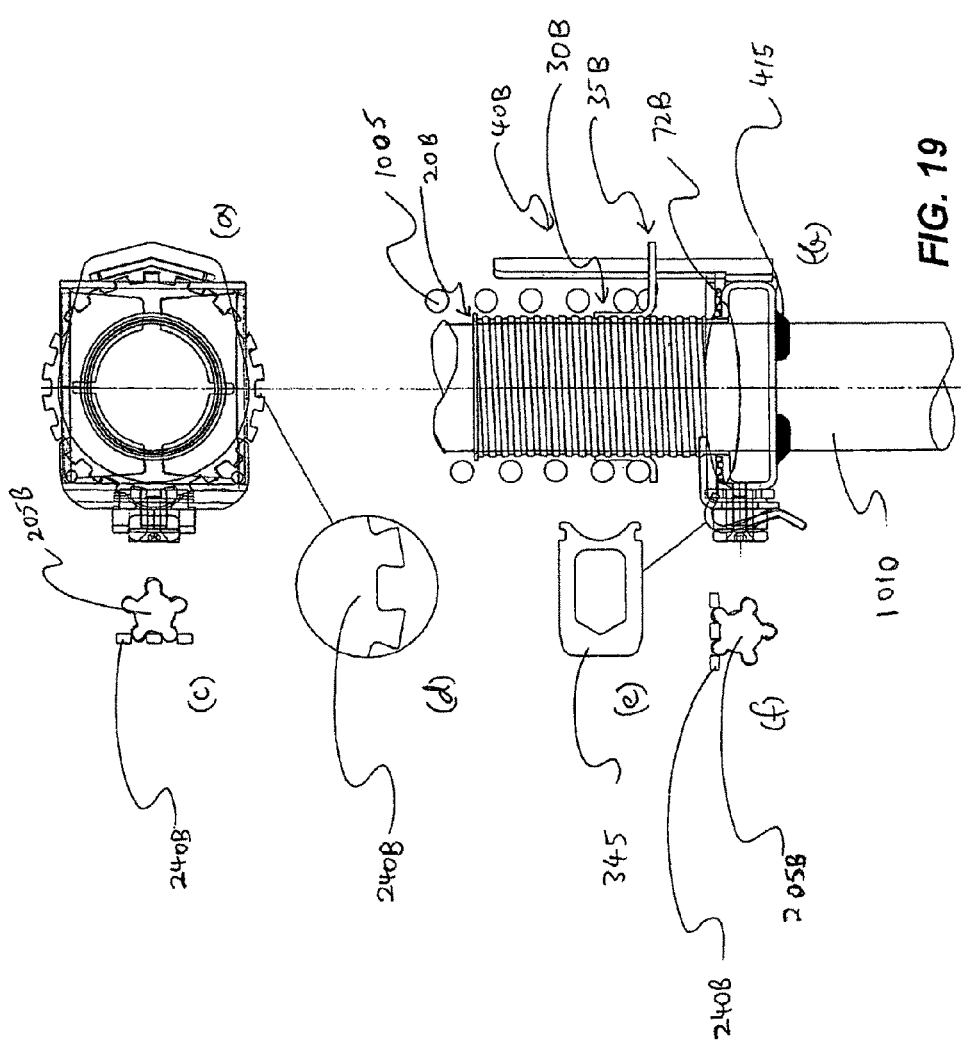
FIG. 19(a) is a top view of a suspension height adjustment mechanism in accordance with a fifth preferred embodiment of the present invention.
FIG. 19(b) is a side view of the suspension height adjustment mechanism of FIG. 19(a)
FIG. 19(c) is a front view of a first gear portion and a side view of the second gear portion of the suspension height adjustment mechanism of FIG. 19(a) in meshing engagement.
FIG. 19(d) is an enlarged top view of two teeth of a second gear portion of the suspension height adjustment mechanism of FIG. 19(a)
FIG. 19(e) is a side view of a resilient plate of the suspension height adjustment mechanism of FIG. 19(a)
FIG. 19(f) is a front view of the first gear portion of the suspension height adjustment mechanism of FIG. 19(a).

In another variation, referring to the embodiment of FIG. 19, a bottom surface of the base 45 is welded 415 to the dampener 1010.

While the invention has been described with reference to a number of preferred embodiments it should be appreciated that the invention can be embodied in many other forms.

For example, in another variation a rotatable assembly may be provided by a single rotatable member.

In another embodiment, the tool engagement portion 25 is actuated by an electric motor such that the electric motor may be remotely controlled, for example, from within the vehicle or on the dashboard. In one embodiment, a suspension height adjustment arrangement for each wheel may be controlled in this manner.

In another variation, the electric motor of the tool engagement portion 25 of the suspension height adjustment mechanism of each wheel can be automatically controlled in an active suspension system, for example, incorporating feedback from a G-Force meter.

In another embodiment, the rotatable member 20 is controlled by a worm drive arrangement.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

INDUSTRIAL APPLICABILITY

It is apparent from the above, that the arrangements described are applicable to the automotive and aftermarket modifications industries.

The claims defining the invention are as follows:

1. A suspension height adjustment mechanism comprising:
   a main body,
   a rotatable assembly being rotatably mounted to the main body and having a first threaded portion,
   a tool engagement portion for rotating the rotatable assembly,
   a spring support having a second threaded portion engaging the first threaded portion,
   an anti-rotation means on the spring support adapted to cooperate with a corresponding anti-rotation means on the main body to prevent rotation of the spring support with respect to the main body,
   such that, in use, rotation of the tool engagement portion causes the spring support to axially translate along the rotatable assembly, thus adjusting the height of the suspension.

2. A suspension height adjustment mechanism as defined in claim 1, wherein an end of the rotatable assembly proximal to the main body comprises a shaft aligned with the axis of the rotatable assembly and adapted to extend through an aperture in the main body to terminate at the tool engagement portion.

3. A suspension height adjustment mechanism as defined in claim 1, further comprising an auxiliary body comprising an auxiliary assembly rotatably mounted thereto, the auxiliary assembly comprising a first gear portion and the tool engagement portion, wherein an end of the rotatable assembly proximal to the main body comprises a second gear portion meshing with the first gear portion, such that rotation of the tool engagement portion causes the first gear portion to rotate the second gear portion and thus rotate the rotatable assembly.

4. A suspension height adjustment mechanism as defined in claim 3, wherein the axis of rotation of the first gear portion is non-parallel with the axis of rotation of the second gear portion.

5. A suspension height adjustment mechanism as defined in claim 4, wherein the axis of rotation of the first gear portion is substantially perpendicular to the axis of rotation of the second gear portion.

6. A suspension height adjustment mechanism as defined in claim 3, wherein the axis of rotation of the first gear portion is substantially parallel with the axis of rotation of the second gear portion.

7. A suspension height adjustment mechanism as defined in claim 3, wherein the first and second gear portions are peripherally disposed around the auxiliary assembly and rotatable assembly, respectively.

8. A suspension height adjustment mechanism as defined in claim 3, wherein the diameter of the second gear portion is larger than the diameter of the first gear portion.

9. A suspension height adjustment mechanism as defined in claim 3, wherein the main body and the auxiliary body are integral.

10. A suspension height adjustment mechanism as defined in claim 1, wherein the anti-rotation means is one or more tongues, the corresponding anti-rotation means is one or more grooves and the one or more tongues are adapted for sliding engagement in the one of more grooves.

11. A suspension height adjustment mechanism as defined in claim 1, wherein the anti-rotation means is one or more grooves and the corresponding anti-rotation means is one or more tongues adapted for sliding engagement in the one or more grooves.

12. A suspension height adjustment mechanism as defined in claim 1, wherein the first threaded portion is externally disposed on the rotatable assembly and the spring support comprises a tube and a circumferential flange extending from the outer surface thereof, the second threaded portion being disposed on an inner surface of the tube.

13. A suspension height adjustment mechanism as defined in claim 1, wherein the anti-rotation means is integral with the spring support.

14. A suspension height adjustment mechanism as defined in claim 1, wherein the corresponding anti-rotation means is provided by the main body.

15. A suspension height adjustment mechanism as defined in claim 14, wherein the corresponding anti-rotation means is integral with the main body.

16. A suspension height adjustment mechanism as defined in claim 1, wherein the rotatable assembly is in the form of a tube and is adapted to house a damper or portion thereof.

17. A suspension height adjustment mechanism as defined in claim 1, wherein the main body forms part of a suspension lower mount.

18. A suspension height adjustment mechanism as defined in claim 1, wherein the main body forms part of a suspension upper mount.

19. A suspension height adjustment mechanism as defined in claim 1, wherein the tool engagement portion is adapted for rotation by a hand tool, an electric drill tool or a pneumatic drill tool.

20. A vehicle suspension system comprising the suspension height adjustment mechanism of claim 1.

21. A vehicle suspension system as defined in claim 20 comprising one of a coil spring, hydraulic spring, pneumatic spring or magnetic spring.

22. A vehicle suspension system as defined in claim 20, wherein the spring support is adapted to support a coil, hydraulic, pneumatic or magnetic spring.

23. A vehicle suspension system as defined in claim 22, wherein the spring is a conventionally wound compression coil spring.

24. A vehicle suspension system as defined in claim 22, wherein the spring is a progressively wound compression coil spring having a region of reduced coil pitch at one end of the spring.

25. A vehicle suspension system as defined in claim 20, wherein the tool engagement portion is located and orientated in such a way that it can be turned by a tool from the side of the vehicle adjacent the suspension system.

26. A vehicle suspension system as defined in claim 20, wherein the tool engagement portion is adapted for rotation by either a power tool or a hand tool.

27. A vehicle suspension system as defined in claim 26, wherein the tool engagement portion is adapted for rotation by a power tool only.

28. A vehicle comprising the vehicle suspension system of claim 20.

29. A vehicle comprising the suspension height adjustment mechanism of claim 1.

* * * * *